UNITED STATES PATENT OFFICE 2,690,814

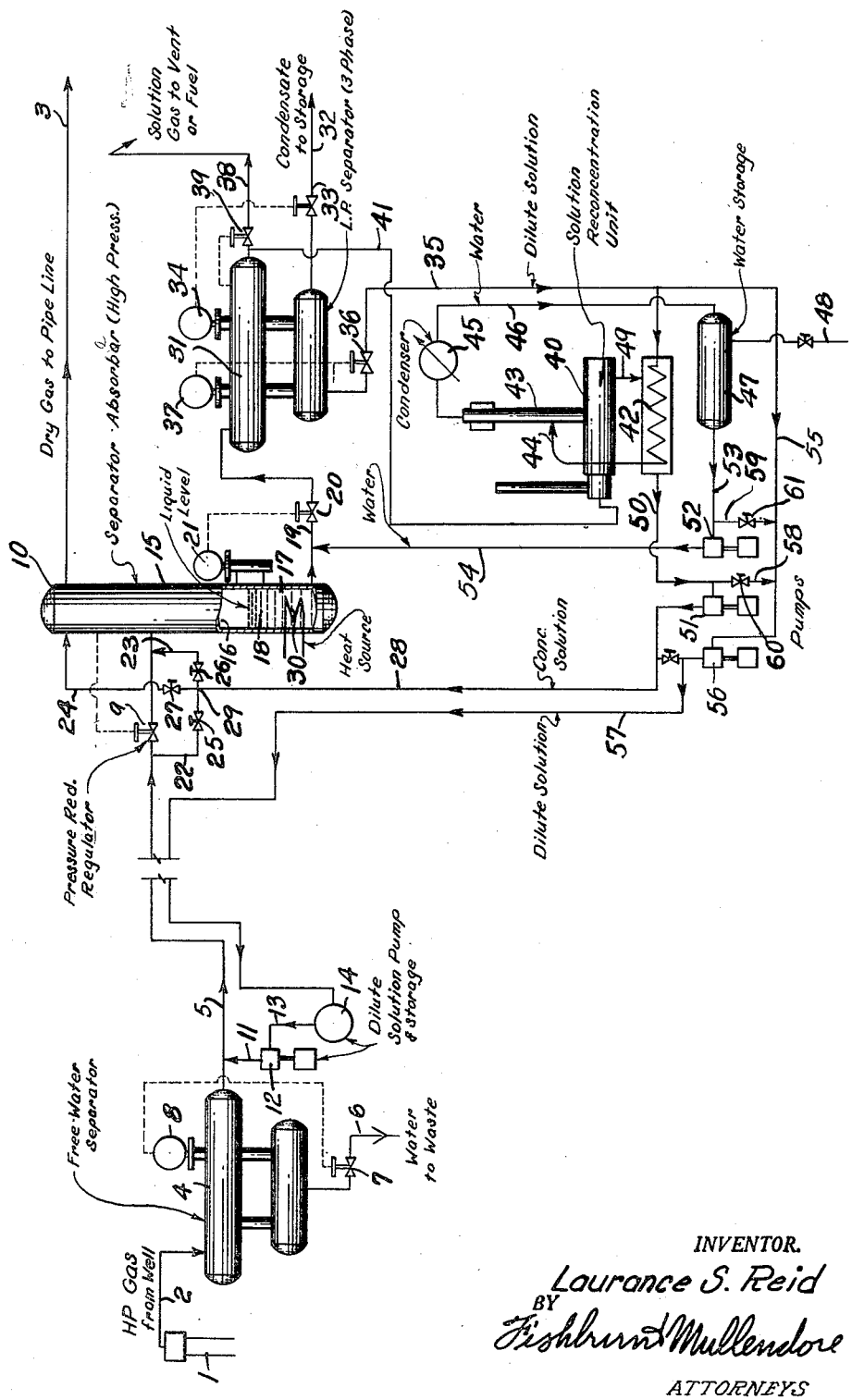

METHOD OF DEHYDRATING NATURAL GAS AND RECOVERY OF LIQUEFIABLE HYDROCARBONS THEREFROM AT HIGH PRESSURES

Laurance S. Reid, Norman, Okla.

Application November 9, 1950, Serial No. 194,814

12 Claims. (Cl. 183—114.6)

This invention relates to a method of and apparatus for dehydrating natural gas and for the recovery of liquefiable hydrocarbons therefrom at high pressures, for example, pressures substantially approaching the well head pressures at which the gas is produced so that the product gas may be delivered to the purchaser without the necessity of compression.

The principal object of the invention is to provide an effective method and apparatus for economically and practicably dehydrating natural gas near the site of production for delivery to the initial terminal of a transportation system or other remote use.

It is well known that production of natural gas at pressures up to, for example, 6,000 p. s. i. g. has heretofore been complicated by formation of gas hydrates in the pipe lines and processing equipment of the producer. These hydrates are formed through loose chemical combination of water and the lighter normally gaseous hydrocarbons of the paraffin series and they occur in the presence of water when the ambient temperature of the gas is less than the hydrate formation temperature for a given pressure and when there is sufficient agitation to attain equilibrium between the vapor and liquid phases. When the gas is produced and processed at such high pressures, all of the factors for hydrate formation are present and the producer's equipment and gathering pipe lines become clogged and rendered inoperative by the gas hydrates. It has been proposed at various times to inject a hydrate inhibitor into the high pressure gas stream, and compounds such as ammonia and various lower alcohols have been used with some success. However, the vapor pressure of these compounds is relatively high so that recovery and re-use of the inhibitor cannot be accomplished; hence the cost is high. It has been proposed to employ recoverable compounds of lower vapor pressure, such as glycerols, glycols and amines, but difficulties are encountered with concentrated solutions when atmospheric temperatures are low because of relatively high freezing points, high viscosities, and inability to effect intimate dispersion of the inhibitor in the gas stream.

I have discovered that only the most highly concentrated solutions of triethylene glycol and to a lesser extent of effectiveness diethylene glycol are capable of absorbing water vapor from gas at pressures in excess of 3000 p. s. i. g., and at atmospheric tmperatures, while at lower pressures, ethylene-, diethylene-, and triethylene glycols are progressively more effective desiccants in the order named. Although it is known that concentrated glycol solutions will bind condensed water and prevent gas hydrate formation at pressures greater than 3000 p. s. i. g., I have discovered that more dilute solutions, where the glycol concentration ranges from 50 to 70 percent by weight, are equally effective as inhibitors. Said dilute glycol solution has an extremely low freezing point, its viscosity is adequately low at low atmospheric temperatures so that it flows and pumps freely, and it can be readily dispersed into a gas stream without use of spray nozzles or expansion valves. I have also found that, when a mixture of gas and said dilute glycol solution is expanded to a pressure lower than 3000 p. s. i. g., gas hydrates do not form as a result of the refrigeration effect and the gas is effectively dehydrated so that its dew point is substantially lower than the temperature prevailing in the separating zone. I have also found that, by augmenting the dilute glycol solution in the flow stream by adding concentrated glycol just prior to expansion, even greater dehydration of the gas is effected.

It is therefore a principal object of the present invention to provide a method of eliminating operational difficulties that are caused by hydrates forming in the pipe lines leading from the sources of gas supply to the dehydrating plant.

Liquid hydrocarbons may be readily and inexpensively removed from high pressure gas streams through condensation brought about by cooling the gas incidental to expansion of the gas to the delivery pressure, but again the problems of hydrate formation at such temperatures have rendered such methods inoperative for practical purposes.

Therefore, a further object of the present invention is to provide for injection of a concentrated dehydrating solution in a manner to act as a hydrate inhibitor and prevent freeze-ups and hydrate formation incidental to expansion of the gas.

Where hydrate formation, which usually attends substantial expansion of the gas, is inhibited by addition of ammonia, lower alcohols, brines, et cetera, or where said hydrates are permitted to form on expansion and are purposely trapped and decomposed by heat, the water vapor content of the gas passing from the separating zone corresponds to saturation conditions for the prevailing temperature and pressure resulting from said expansion. In many cases, the degree of dehydration effected by this means is not adequate so that additional dehydration facilities must be provided.

A further object of this invention is to provide a method for dehydrating the gas expanding into a low temperature separting zone so that the residual water vapor content of the gas passing from said separating zone is substantially less than the saturation conditions corresponding to the temperature and pressure prevailing in that zone.

A further difficulty in the use of such glycols is caused through partial loss by solution of the glycols in the hydrocarbon condensate product. Loss of concentrated glycol solution from solubility in hydrocarbon liquids varies from 0.03 to 0.07 per cent by weight so that the cost of replacement is relatively great, particularly where hydrocarbon liquids are produced in large quantities. I have found that solution loss may be substantially reduced (to less than 0.003 per cent by weight) by diluting the glycol solution with water to effect a glycol concentration ranging from 25 to 50 per cent prior to separation of the solution from the hydrocarbon liquid.

A further object of the invention is to provide a method of reducing the affinity of the hydrocarbon liquid for the glycol.

Another prime object of the present invention is to provide a single reconcentrating unit for preparing the treating solutions in accordance with the operating conditions for accomplishing the fore-mentioned objects of the present invention.

In accomplishing the above and other objects of the invention hereinafter pointed out, I have provided an improved method and apparatus for producing and processing gas at high pressures and illustrated in the accompanying drawing wherein:

The single figure is a diagrammatic view of an apparatus for producing and treating gas in accordance with the present invention.

Referring more in detail to the drawing:

1 designates a well that has been drilled into a high pressure gas producing formation from which flow is effected under pressure of the formation into a pipe line 2 which, along with the discharge lines from other producing wells leads to a central gas dehydrating and processing unit in which the gas is prepared for delivery through a pipe line 3 leading to the initial terminal of a gas transportation system or for other end use (not shown). Usually such high pressure well flows contain substantial quantities of free water and it is desirable to connect the discharge line 2 of each well into a free water separator 4 in which the hydrocarbons separate and discharge through a continuation 5 of the line 2 while the free water is discharged to waste through a pipe 6 under control of a valve 7 operated by a liquid level controller 8.

The natural gas contains quantities of readily condensable hydrocarbons which exist in the vapor state at high pressure and temperature at which the gas is produced. It is therefore desirable to effect condensation of such hydrocarbons at substantially high pressures, for example, as high as 2000 p. s. i. g. This may be effected by expanding the gas and utilizing the refrigeration effect of expansion to reduce the temperature of the gas below its dew-point at the expanded pressure. The pipe 5 is therefore provided with a pressure reducing regulator 9 through which the gas is expanded into a separator-absorber 10. This method of cooling and expanding the gas operates satisfactorily if it were not for the water vapor present in the gas flow which condenses on expansion and combines with the lighter gaseous hydrocarbons to form hydrates in the pipe line and freeze-up the high pressure regulator. Consequently, the flow lines are clogged with solids and the apparatus is not operative.

As above pointed out, it has been proposed to inject into the gas stream a hygroscopic liquid and bind the condensed water to prevent formation of hydrates and clogging of the pipe lines. Usually the condensation and separation apparatus is located a substantial distance from the producing well in that it serves to process flow from a number of wells owned by the same producer, but when concentrated solutions are injected into the gas stream adjacent the point of free water separation, the solutions are not effective in preventing hydrate formations in the pipe line 5, particularly at low atmosperic temperatures and temperatures approaching the freezing point of the solution. This is especially true of the more effective dehydrating solutions of the polybasic aliphatic alcohols such as ethylene, diethylene, and triethylene glycols. Such glycols are substantially viscous at low temperatures and freeze at temperatures encountered in many gas producing fields. It is known that because of such viscosity, glycols cannot sufficiently disperse in the gas flow to prevent hydrate formation. This difficulty is eliminated by proper temperature control where the concentrated glycol solution is admitted into the gas stream adjacent the absorbing and separating apparatus. I have discovered that such diffculties may be overcome by injecting into the gas flow a dilute solution of ethylene, diethylene or triethylene glycol immediately adjacent the point of free water separation and which has a freezing point substantially below that of a concentrated solution of such glycols and is substantially fluid at all operating temperatures. The dilute solution therefore permits uniform dispersion in the gas stream with the particles sufficiently divided to form intimate contacts with the gas and effectively eliminates hydrates forming in the pipe lines 5 or expansion valves 9.

In the illustrated instance, the dilute solution is injected into the pipe line 5 through a feed line 11 by means of a pump 12 having connection with a supply line 13 connected with a dilute solution storage tank 14. The concentrated solution, to effect completion of the desired ultimate dehydration, may then be admitted at any point adjacent the separating and absorbing apparatus which includes a high pressure vessel 15 preferably a vertically arranged cylindrical tank with sufficient elongation to provide the inner chamber 16 of capacity to provide the contact between the gas and the concentrated solution necessary to complete absorption of the water vapor and permit condensation of the hydrocarbons capable of condensing at the reduced temperature and pressure resulting from expansion of the gas in the pressure regulator. The glycol solution together with the hydrocarbon condensates flow to the bottom portion 17 of the separator-absorber and collect in a body 18 to be drawn off through a pipe 19 under control of a valve 20 under operation by a liquid level controller 21. The concentrated solution may be admitted to the gas flow either on the up or down stream side of the pressure regulator 9 through pipes 22 and 23 or the concentrated solution may be discharged directly into the upper portion of the separator-absorber 10 through a pipe 24, the flow through the respective pipes being under control of valves 25, 26, and 27 that are connected therein so that any one or combination of the inlets may be used for introducing the concentrated solution from a main supply pipe 28 that is connected with all of the injection pipes as indicated at 29.

The dehydrated gas, on separation, is discharged through the pipe 3 previously mentioned and is sufficiently dry to prevent any hydrate formation in the discharge line.

The separated liquids 18 are preferably heated by means of an immersion heater 30 that is contained in the base of separator-absorber 15 and are then discharged through the pipe 19 to a liquid separator 31 in which the liquid hydrocarbon condensates and glycol solution containing the absorbed water are readily stratified and separated, the hydrocarbon condensates being discharged to suitable storage through a pipe 32 having a valve 33 actuated by a liquid controller 34. The glycol solution containing the absorbed water is discharged through a pipe 35 under control of a valve 36 actuated by a liquid level controller 37. During separation of the condensate and glycol solution a certain amount of solution gas is released from the condensate which is vented through a pipe 38 under control of a pressure regulator valve 39.

A portion of the vented gas may be used as fuel to reconcentrate the solution in a still 40, the fuel gas being taken off ahead of the pressure regulating valve 39 and directed through a pipe 41 to the burner of the still. Part of the solution containing the absorbed water is passed through a heat exchanger 42 and then discharged into the tower 43 of the still through a pipe 44. Sufficient heat is maintained to distill off the water in the form of steam which is discharged into a condenser 45 whereby the steam is condensed and the water supplied through a pipe 46 to a water storage tank 47, from which surplus water is discharged through a pipe 48 to waste. The balance of the water is used to blend the dilute inhibiting solution. Water may also be used for addition to the warmed liquids discharged from the separator-absorber to effect controlled dilution of the glycol solution and thereby minimize loss of glycol by solution in the hydrocarbon liquid.

The reconcentrated solution is discharged from the still through a pipe 49 for flow through the heat exchanger 42 to give up heat to the incoming dilute solution and is discharged through a pipe 50 to the inlet of a pump 51 which supplies the concentrated solution to the pipe 28 for recycling through the separator-absorber.

Water is supplied from the water storage vessel 47 to a pump 52 through a pipe 53, the discharge of the pump being connected with a pipe 54 which connects with the pipe 19 to supply water to the mixed stream of liquids flowing from the separator-absorber to the condensate separator.

A portion of the dilute solution is used for supplying the dilute solution storage tank 14 through a pipe 55 that is connected with the pipe 35 and leads to a pump 56 which discharges the dilute solution into a pipe 57 leading to the storage tank 14. In order that the solution may be delivered to the tank 14 in desired dilution, means is provided for supplying sufficient concentrated solution and water to the pipe 55 by way of pipe connections 58 and 59 with the respective pipes 50 and 53, the pipes 58 and 59 being provided with control valves 60 and 61 respectively so as to control the proportional flow of water and concentrated solution to the pump for making up the dilute solution to be delivered to the storage tank 14.

In operation, the gas flow from the well is discharged through the pipe 2 into the separator 4 where the free water separates and is discharged to waste through the pipe 6. The well flow released from the major portion of the free water is discharged into the pipe 5. At this point a dilute inhibiting solution, for example, one containing from 50 to 70 per cent glycol, is injected into the well flow to prevent formation of hydrates in the line 5 and to cooperate subsequently with the concentrated dehydrating solution to prevent hydrate formation and simultaneous dehydration of the gas when expanded into the separator-absorber by the pressure reducing regulator 9.

The concentrated solution may be discharged under pressure of the pump 51 through one or more of the pipes 22, 23, or 24 by opening the proper valves 25, 26, or 27. The concentrated solution is thus mixed with the gas stream either on the up or down stream side of the pressure reducing regulator and/or is directly admitted into the upper end of the separator-absorber in counterflow with the gas admitted through the pipe 5. In any event, the concentrated solution which preferably contains 95 to 99 per cent glycol is admitted in sufficient quantity to assure the required dehydration of the gas. A concentrated glycol solution is necessary because the degree of dehydration to be accomplished is a function of the glycol content. It is true that a high glycol concentration is aggravative to glycol losses in a hydrocarbon solution. However, this loss is substantially eliminated by reducing the concentration of the glycol-water solution after the liquids have been collected in the bottom of the separator-absorber. The gas flow, on expansion into the separator-absorber, is cooled so that the recoverable liquid hydrocarbons are condensed and gravitate along with the wet glycol solution to the bottom of the separator-absorber where the mixed liquids are discharged through the pipe 19 in which water is added through pipe 54 so as to assure sufficient dilution of the glycol solution to prevent glycol solution in the hydrocarbon condensate when the condensates separate from the solution in the separator 31. Solution gas, saturated solution, and condensate separate in the separator 31. The saturated gas is discharged through the pipe 38 while the condensate is discharged through the pipe 32 and the glycol solution through the pipe 35. The major portion of the solution is conveyed to the still for reconcentration to be recycled through the separator-absorber while the remaining portion is used in making up dilute solution for initial contact with the well stream and pumped to the storage tank 14 to maintain the supply of inhibiting solution.

From the above, it is obvious that I have provided a method of and apparatus for effecting dehydration of natural gas and for the recovery of hydrocarbons whereby the steps may be carried on at high pressures substantially approaching the well head pressures without interference by gas hydrates and freeze-ups.

It is also obvious that I have provided a process whereby the gas may be inexpensively cooled through expansion for effecting condensation of recoverable liquid hydrocarbons. The dehydrated natural gas may therefore be delivered to the initial terminal of the gas transportation line or to any other end use without danger of stoppages caused by hydrate formation.

What I claim and desire to secure by Letters Patent is:

1. A method of treating natural gas to effect dehydration of the gas and removal therefrom of hydrocarbon condensates and which involves maintenance of flow of the gas under high pressure from a distant producing well through a gathering pipe line to the place of treatment, said method including dispersing a dilute glycol solution into the gathering pipe line substantially at the site of the producing well to inhibit formation of gas hydrates in the gathering pipe line, expanding the gas flow into a dehydrating and separating zone at the place of treatment to cool said gas and effect condensation of the liquefiable hydrocarbon components of the gas, introducing a concentrated glycol solution into the gas substantially at the place of treatment for absorbing water vapor content of the gas, collecting the glycol solution and condensate in said zone, heating the collected liquids, effecting gravity separation of said glycol solution from the hydrocarbon condensates, recirculating a part of the separated glycol solution to provide said dilute solution supply, removing the water component from the remainder of the separated glycol solution to obtain said concentrated glycol solution, and recycling the concentrated solution in contact with the gas at said place of treatment to maintain the supply of said concentrated solution.

2. A method of treating natural gas to effect dehydration of the gas and removal therefrom of hydrocarbon condensates and which involves maintenance of flow of the gas under high pressure from a distant producing well through a gatering pipe line to the place of treatment, said method including dispersing a dilute glycol solution into the gathering pipe line at the site of the producing well to inhibit formation of gas hydrates in the gathering pipe line, expanding the gas flow into a dehydrating and separating zone at the place of treatment to cool said gas and effect condensation of the liquefiable hydrocarbon components of the gas, introducing a concentrated glycol solution into the gas substantially at the place of treatment for absorbing water vapor content of the gas, collecting the glycol solution and condensate in said zone, heating the collected liquids, effecting gravity separation of said glycol solution from the hydrocarbon condensates, removing the water component from the separated glycol solution to obtain said concentrated glycol solution, recycling the concentrated solution in contact with the gas at said place of treatment to maintain the supply of said concentrated solution, mixing a portion of the water component of said separated glycol solution with a portion of the concentrated solution to form said dilute glycol solution, and recycling the dilute solution to the place of contact of the dilute solution with the gas flow at said producing well.

3. A method of treating natural gas to effect dehydration of the gas and removal therefrom of hydrocarbon condensates and which involves maintenance of flow of the gas under high pressure from a distant producing well through a gathering pipe line to the place of treatment, said method including dispersing a dilute glycol solution into the gathering pipe line at the site of the producing well to inhibit formation of gas hydrates in the gathering pipe line, expanding the gas flow into a dehydrating and separating zone at the place of treatment to cool said gas and effect condensation of the liquefiable hydrocarbon components of the gas, introducing a concentrated glycol solution into the gas substantially at the place of treatment for absorbing water vapor content of the gas, collecting the glycol solution and condensate in said zone, heating the collected liquids, introducing water into said liquids for reducing affinity of the hydrocarbon condensates for the glycol of said solution, effecting gravity separation of said glycol solution from the hydrocarbon condensates, recirculating a part of the separated glycol solution to provide said dilute solution supply for dispersion into the gathering pipe line, removing the water component from the remainder of the separated glycol solution to obtain said concentrated glycol solution, and recycling the concentrated solution in contact with the gas at said place of treatment to maintain the supply of said concentrated solution.

4. A method of treating natural gas to effect dehydration of the gas and removal therefrom of hydrocarbon condensates and which involves maintenance of flow of the gas under high pressure from a distant producing well through a gathering pipe line to the place of treatment, said method including dispersing a dilute glycol solution into the gathering pipe line at the site of the producing well to inhibit formation of gas hydrates in the gathering pipe line, expanding the gas flow into a dehydrating and separating zone at the place of treatment to cool said gas and effect condensation of the liquefiable hydrocarbon components of the gas, introducing a concentrated glycol solution into the gas substantially at the place of treatment for absorbing water vapor content of the gas, collecting the glycol solution and condensate in said zone, heating the collected liquids, introducing water into said liquids for reducing affinity of the hydrocarbon condensates for the glycol of said solution, effecting gravity separation of said glycol solution from the hydrocarbon condensates, removing the water component from the separated glycol solution to obtain said concentrated glycol solution, recycling the concentrated solution in contact with the gas at said place of treatment to maintain the supply of said concentrated solution, mixing a portion of the water component of said separated glycol solution with a portion of the concentrated solution to make up said dilute glycol solution, and recycling the dilute solution to the place of contact of the dilute solution with the gas flow at said producing well.

5. A method of treating natural gas to effect dehydration of the gas and removal therefrom of hydrocarbon condensates and which involves maintenance of flow of the gas under high pressure from a distant producing well through a gathering pipe line to the place of treatment, said method including dispersing a dilute glycol solution into the gathering pipe line at the site of the producing well to inhibit formation of gas hydrates in the gathering pipe line, expanding the gas flow into a dehydrating and separating zone at the place of treatment to cool said gas and effect condensation of the liquefiable hydrocarbon components of the gas, introducing a concentrated glycol solution into the gas substantially at the place of treatment for absorbing water vapor content of the gas, collecting the glycol solution and condensate in said zone, heating the collected liquids, inroducing water into said liquids for reducing affinity of the hydrocarbon condensates for the glycol of said solution, effecting gravity separation of said glycol solution from the hydrocarbon condensates, removing the water component from the remainder of the separated glycol solution to obtain said concentrated glycol solution, recycling the concentrated solution in contact with the gas at said place of treatment to maintain the supply of said concentrated solution, mixing a portion of the water component of said separated glycol solution with a portion of the cencentrated solution to form said dilute glycol solution, cycling said dilute glycol solution for said dispersion into the gathering pipe line, and cycling a part of the removed water for mixture with the liquids from the separating zone to maintain dilution of the glycol solution component of said liquids.

6. The method of processing a flow of natural gas at high pressures which method includes expanding the gas flow into a dehydrating and separating zone to cool the gas and effect condensation of the liquefiable hydrocarbon component of the gas, introducing a concentrate glycol solution into the gas at said zone for absorbing water vapor content of the gas, collecting the glycol solution and hydrocarbon condensate as a mixture, reducing the glycol concentration in the glycol-water component of the mixture to reduce the solubility of the glycol in the hydrocarbon component of the mixture and separating the liquid hydrocarbon component from the glycol-water component.

7. The method of processing a flow of natural gas at high pressures which method includes expanding the gas flow into a dehydrating and separating zone to cool the gas and effect condensation of the liquefiable hydrocarbon component of the gas, introducing a concentrate glycol solution into the gas at said zone for absorbing water vapor content of the gas, collecting the glycol solution and hydrocarbon condensate as a mixture, heating the mixture, reducing the glycol concentration in the glycol-water component of the mixture to reduce the solubility of the glycol in the hydrocarbon component of the mixture and separating the liquid hydrocarbon component from the glycol-water component.

8. The method of processing a flow of natural gas at high pressures to prevent hydrate formation and to obtain liquefiable hydrocarbons from the gas, which method includes dispersing a dilute glycol solution into the flow of gas to inhibit the formation of gas hydrates therein during passage to a dehydrating and separating zone, expanding the gas flow into said zone to cool said gas and effect condensation of the liquefiable hydrocarbon components of the gas, introducing a concentrated glycol solution into the gas in said zone for absorbing water vapor content of the gas, collecting the glycol solution and hydrocarbon condensate, and separating said glycol solution from the hydrocarbon components.

9. The method of processing a flow of natural gas at high pressures to prevent hydrate formation and to obtain liquefiable hydrocarbons from the gas, which method includes dispersing a dilute glycol solution into the flow of gas to inhibit the formation of gas hydrates therein during passage to a dehydrating and separating zone, expanding the gas flow into said zone to cool said gas and effect condensation of the liquefiable hydrocarbon components of the gas, introducing a concentrated glycol solution into the gas in said zone for absorbing water vapor content of the gas, collecting the glycol solution and hydrocarbon condensate as a mixture, reducing the glycol concentration in the glycol-water component of the mixture by adding water to the mixture to decrease the solubility of the glycol in the hydrocarbon component of the mixture, and separating the liquid hydrocarbon component from the glycol-water component.

10. The method of processing a flow of natural gas at high pressures to prevent hydrate formation and to obtain liquefiable hydrocarbons from the gas, which method includes dispersing a dilute glycol solution into the flow of gas to inhibit the formation of gas hydrates therein during passage to a dehydrating and separating zone, expanding the gas flow into said zone to cool said gas and effect condensation of the liquefiable hydrocarbon components of the gas, introducing a concentrated glycol solution into the gas in said zone for absorbing water vapor content of the gas, collecting the glycol solution and hydrocarbon condensate, separating said glycol solution from the hydrocarbon components, recirculating a portion of the separated glycol solution to the gas flow for providing said dilute glycol solution, reconcentrating the remaining portion of said separated solution and recycling the reconcentrated solution to said dehydrating and separating zone.

11. The method of processing a flow of natural gas at high pressures to prevent hydrate formation and to obtain liquefiable hydrocarbons from the gas, which method includes dispersing a dilute glycol solution into the flow of gas to inhibit the formation of gas hydrates therein during passage to a dehydrating and separating zone, expanding the gas flow into said zone to cool said gas and effect condensation of the liquefiable hydrocarbon components of the gas, introducing a concentrated glycol solution into the gas in said zone for absorbing water vapor content of the gas, collecting the glycol solution and hydrocarbon condensate as a mixture, reducing the glycol concentration in the glycol-water component of the mixture by adding water to the mixture to decrease the solubility of the glycol in the hydrocarbon component of the mixture, separating the liquid hydrocarbon component from the glycol-water component, recirculating a portion of the separated glycol-water component to the gas flow for providing said dilute glycol solution, reconcentrating the remaining portion of said separated glycol-water component and recirculating the concentrated glycol-water component to said dehydrating and separating zone.

12. The method of processing a flow of natural gas at high pressures to prevent hydrate formation and to obtain liquefiable hydrocarbons from the gas, which method includes introducing a dilute glycol solution into the flow of gas to inhibit the formation of gas hydrates therein during passage to a dehydrating and separating zone, expanding the gas flow into said zone to cool said gas and effect condensation of the liquefiable hydrocarbon components of the gas, introducing a concentrated glycol solution into the gas in said zone for absorbing water vapor content of the gas, collecting the glycol solution and hydrocarbon condensate, heating the collected liquids, separating the moisture-laden glycol solution from the hydrocarbon condensates, reconcentrating the major portion of the moisture-laden solution to approximately 95 to 99 percent glycol for supplying said concentrated glycol solution, diluting the remainder of the moisture-laden solution to provide a dilute solution of approximately 50 to 70 percent glycol, and returning said dilute and concentrated glycol solutions to the respective points of introduction.

References Cited in the file of this patent

UNITED STATES PATENTS

| Number | Name | Date |
|---|---|---|
| 2,151,248 | Vaughan | Mar. 21, 1939 |
| 2,235,322 | Martin | Mar. 18, 1941 |
| 2,306,553 | Miller | Dec. 29, 1942 |
| 2,461,346 | Patterson | Feb. 8, 1949 |

FOREIGN PATENTS

| Number | Country | Date |
|---|---|---|
| 409,053 | Great Britain | Apr. 26, 1934 |

OTHER REFERENCES

"General College Chemistry," by Babor and Lehrman, 2nd edition, Crowell Co., 1940.

"Pressure Maintenance," by R. A. Carter, The Oil Weekly, July 21, 1941, pages 29 to 33.